United States Patent [19]

Sitko

[11] Patent Number: 4,458,376
[45] Date of Patent: Jul. 10, 1984

[54] APPARATUS FOR WIPING CONTINUOUSLY MOVING STRIP

[75] Inventor: Leopold S. Sitko, South Holland, Ill.

[73] Assignee: Allied Tube & Conduit Corporation, Harvey, Ill.

[21] Appl. No.: 414,781

[22] Filed: Sep. 3, 1982

[51] Int. Cl.³ .............................................. B08B 1/02
[52] U.S. Cl. ..................................... 15/256.5; 15/102; 118/126
[58] Field of Search ............... 15/77, 100, 102, 256.5, 15/256.51; 101/167, 425; 118/119, 126; 100/174; 241/112; 355/15

[56] References Cited

U.S. PATENT DOCUMENTS

| | | | |
|---|---|---|---|
| 2,398,034 | 4/1946 | Oganowski | 117/102 |
| 2,861,541 | 11/1958 | Hornbostel | 15/256.51 X |
| 3,121,247 | 2/1964 | Malicky et al. | 15/256.51 |
| 3,450,098 | 6/1969 | Williams, Jr. | 118/126 |
| 3,575,134 | 4/1971 | Quint | 118/122 |
| 3,675,621 | 7/1972 | Griffin et al. | 118/122 |
| 3,878,578 | 4/1975 | Skudrna | 15/100 |
| 3,930,464 | 1/1976 | Wallsten | 118/122 |
| 4,367,691 | 1/1983 | Bergs | 15/256.5 X |

FOREIGN PATENT DOCUMENTS 2133364 1/1972 Fed. Rep. of Germany ... 15/256.51

*Primary Examiner*—Edward L. Roberts
*Attorney, Agent, or Firm*—Fitch, Even, Tabin & Flannery

[57] ABSTRACT

An assembly for wiping a surface of a continuously moving strip, such as a metal strip, includes a holder, a housing that is slid into and from the holder having an elongated channel extending across the pathway of the strip and facing the strip, an elongated bladder retained within the channel, a wiper blade removably attached to the strip for contacting and wiping the strip and means to inflate the bladder to determine the pressure of the wiper blade against the strip.

12 Claims, 5 Drawing Figures

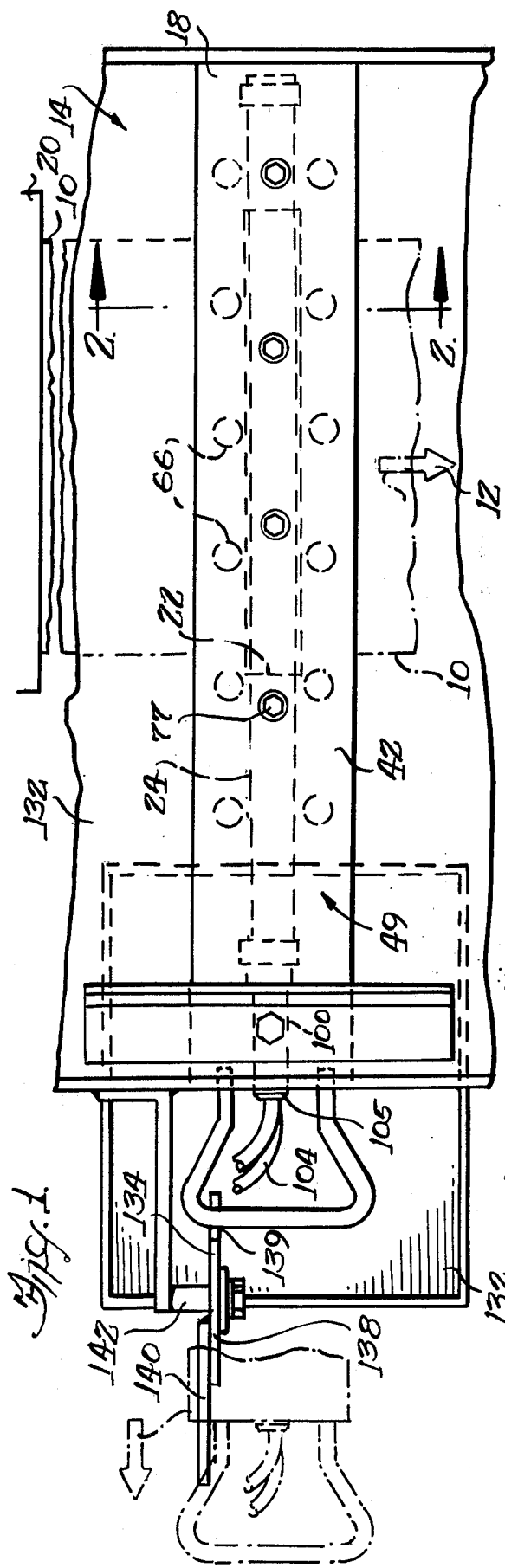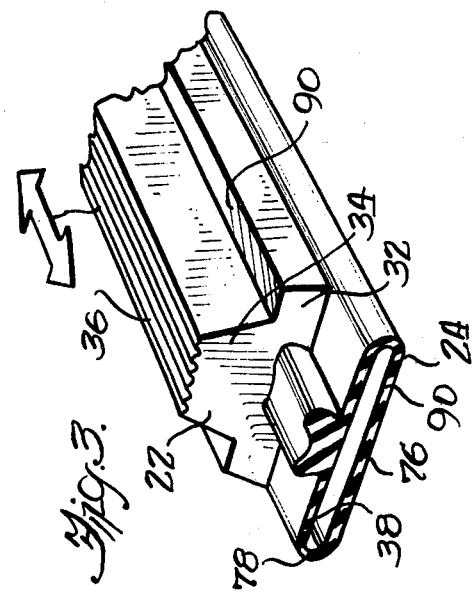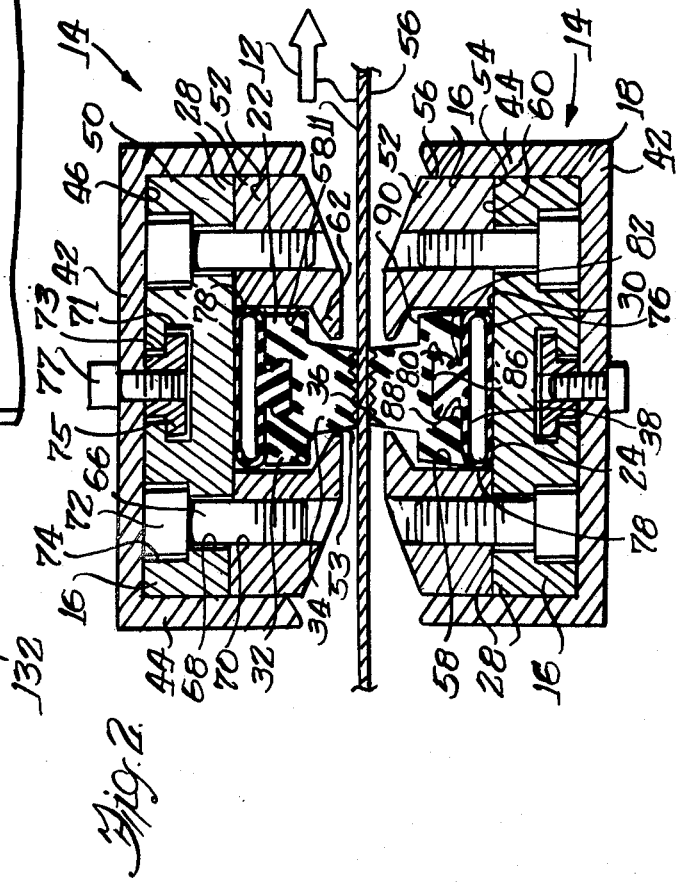

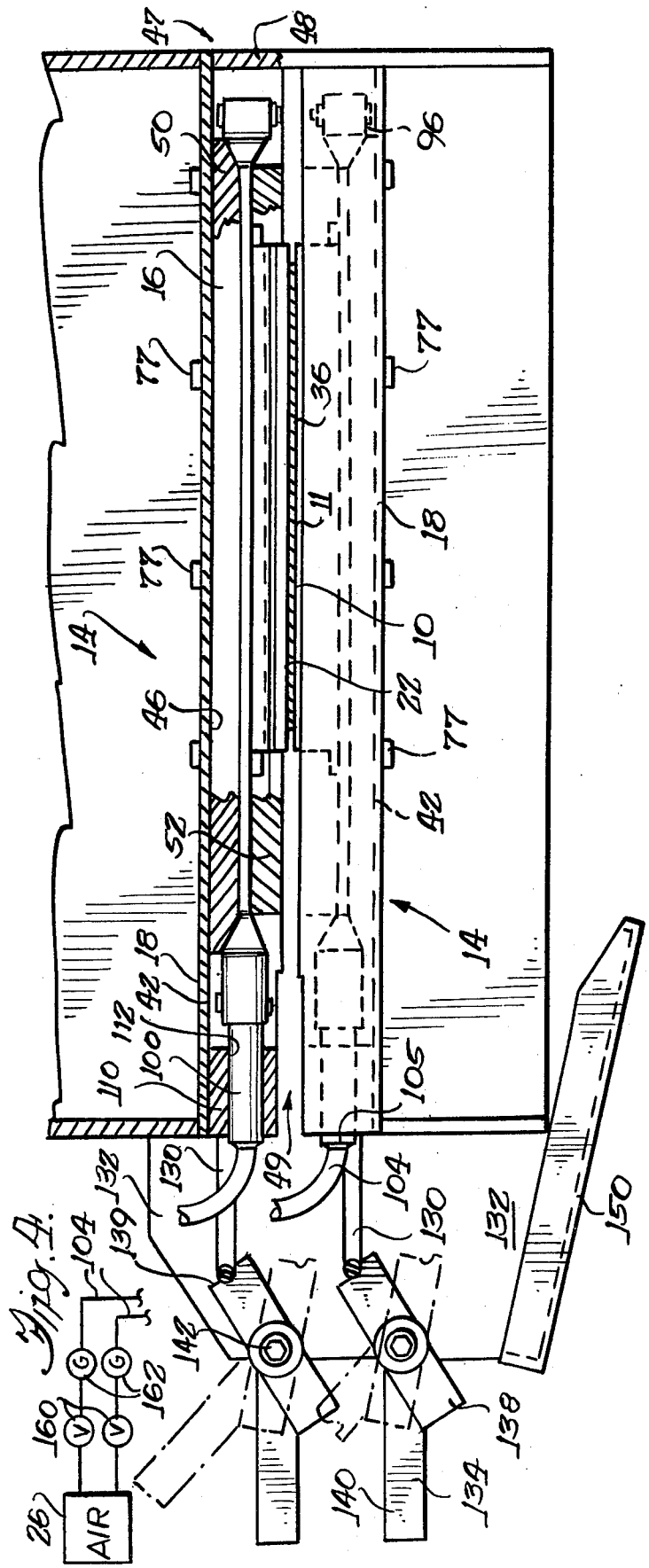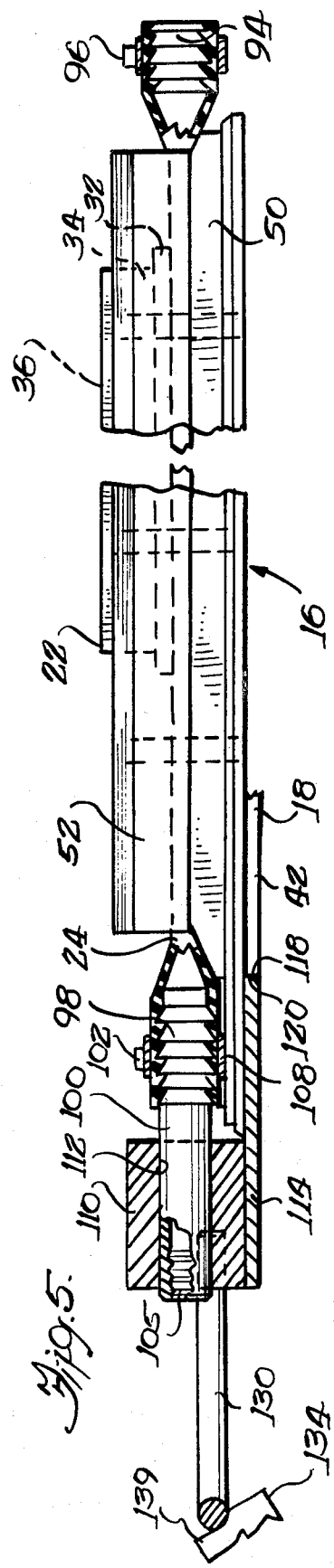

APPARATUS FOR WIPING CONTINUOUSLY MOVING STRIP

The present invention relates to wiping devices and more particularly to apparatus for wiping liquids from the surfaces of a flat elongated object, such as an endless metal strip, moving in a straight line.

BACKGROUND OF THE INVENTION

Flat elongated objects, such as metal strip, may be treated with a variety of liquid substances, such as pickling agents, alkali washes, rinsing solutions etc., for continuous processing. One such use of metal strip in a continuous process is the formation of tubing, such as the process described in U.S. Pat. No. 3,122,114. When the metal strip is treated with such a liquid substance in a continuous process, it is usually necessary that the substance be substantially removed prior to downstream strip processing. Generally there is some oscillation of the traveling strip as it is driven along its pathway, and an effective wiping device should maintain surface contact between a wiping surface and the surfaces of the strip notwithstanding such oscillations.

Heretofore, the most commonly used apparatus for wiping continuously moving strip included rollers positioned to run along the surfaces of the continuously moving strip. As a result of oscillating or weaving both laterally and up and down, it was difficult to position such rollers and apply an appropriate amount of pressure to such rollers to hold them in continuous contact with the surfaces of the strip, and uneven wiping often resulted from poor roller-strip surface contact. Another disadvantage of rollers was that they tended to be cut by the sharp edges of the metal strip thus requiring frequent replacement.

Effective wiping of a flat surface, such as the surfaces of metal strip, may also be effected with a resilient blade, such as a rubber blade. However, resilient blades become worn during use and tend to decrease contact with the strip surface thus reducing wiping efficiency. Eventually the wiping blade must be replaced entirely. In a continuous multistep process, such as forming tubing from strip steel, it is highly disadvantageous to have to stop the process for a detail, albeit important detail, such as wiper blade replacement. Accordingly, it is desirable that an in-line wiping device maintain surface contact of the blade against the strip surface even as the blade wears down and for in-line replacement of the blade when it is worn beyond its usefulness.

SUMMARY OF THE INVENTION

A device for wiping the surface of metal strip or the like moving in a straight-line pathway through a processing line provides for adjusting the pressure of a wiping member or blade against a surface of the strip. A housing assembly extending across the pathway of strip travel enclosing and supporting the wiping device or blade with the blade opening toward the strip. An elongated inflatable member or bladder is disposed in the recess, and the blade is removably attached to the side of the bladder facing the strip. Inflating the bladder holds a wiping surface of the blade against the continuously moving strip with a force that is adjusted according to the pressure to which the bladder is inflated. The device is retained in a holder which permits its removal for in-line blade replacement without stopping the strip processing line.

BRIEF DESCRIPTION OF THE DRAWINGS

FIG. 1 is a plan view of apparatus, embodying various features of the invention, for wiping a treatment substance from surfaces of metal strip or the like continuously moving along a straight-line pathway;

FIG. 2 is a cross-sectional view taken along line 2—2 of FIG. 1 showing a pair of wiping devices retained in holders on either side of the moving strip;

FIG. 3 is an enlarged fragmentary perspective view of a lower inflatable member and an attached wiping member of one of the assemblies of FIG. 2;

FIG. 4 is an elevation view, partially cut away, of the apparatus shown in FIG. 1; and FIG. 5 is an enlarged elevation view of one of the wiping devices.

DETAILED DESCRIPTION OF THE PREFERRED EMBODIMENT

Illustrated in FIG. 1 is apparatus for wiping the surfaces 11 of elongated flat objects, such as metal strip 10, moving continuously along a straight-line pathway in the direction of arrow 12. In the illustrated embodiment, the strip 10 is moving in a horizontal pathway, and two wiping assemblies, indicated generally at 14, each including a wiping device 16 retained within a holder 18, are disposed above and below the continuously moving strip. The pair of wiping assemblies 14 are disposed downstream of a strip treatment station, indicated diagrammatically at 20, where a treatment substance, e.g., a liquid, has been applied to the strip.

In accordance with the present invention, the wiping devices 16 each have a wiping member or blade 22 which is backed by an inflatable member or bladder 24 that is inflated with a source 26 of pressurized gas, e.g., air, to adjust the pressure of the blade against the strip. A housing 28 of the device 16 extends across, e.g., perpendicularly, to the pathway of the moving strip 10 and has an elongated channel 30 facing the strip in which the bladder 24 and a rear portion 32 of the wiper blade 22 are retained and from which a front wiper blade portion 34 with a wiping surface 36 extends to contact the strip. The wiper blade 22 is removably attached to the front 38 of the bladder 24, i.e., the side facing the strip, and its wiping surface 36 is pressed by the inflated bladder 24 against the strip 10 to wipe treatment substance therefrom.

In accordance with a preferred aspect of the invention, each wiping device 16 is slidably removable by sliding it from the holder 18 so that the wiper blade 22 is replaceable in-line should it become worn. Removal of the wiping device 16 from the holder 18 is facilitated by deflation of the bladder 24 to substantially reduce binding of the blade 22 against the surface 11 of the strip.

The holders 18 are U-shaped, each having a backing wall 42, i.e., a top or bottom wall, and a pair of side walls 44 providing a channel 46 in which the wiping devices 16 are received. An inner end 47 (FIG. 4) of each holder 18 is closed by an end wall 48 while the outer end 49 is open for ingress and egress of the wiping device 16.

In the illustrated embodiment, the housing 28 of each wiping device is formed from three solid metal members including a backing plate 50 and two elongated front pieces 52 attached thereto. These solid metal members together define the elongated channel 30, which has a constricted front end 53 for retaining the bladder 24 and wiper blade 22 therein. The backing plate 50 is generally in the shape of a rectangular prism proportioned to fit closely between the side walls 44 and against the backing wall 42 of the holder. The two front pieces 52 have rear surfaces 54 that abut the backing plate 50, flat outer surfaces 56 that lie closely adjacent the side walls of the holder, flat inwardly facing surfaces 58, that together with the front face 60 of the backing plate define the elongated channel 30 and flanges 62 extending inwardly at their front ends to define the constriction 53 at the front end of the channel. The front pieces 52 are attached to the backing plate 50 by a plurality of bolts 66 extending through bores 68 in the backing plate and screwed into threaded bores 70 of the front pieces. The heads 72 of the bolts 66 are countersunk into enlarged portions 74 of the backing plate bores 68.

As a means of removably retaining each housing 28 in the holder 18, the backing plate 42 of each device 16 has an elongated, centrally located "T"-shaped groove or keyway 71, the leg 73 of the "T" opening to the rear surface of the plate, and an elongated "T"-shaped key bar 75, which mates with the keyway, is attached by a plurality of bolts 77 to the backing plate 42 of the holder 18. The housing 28 is slid into the holder 18 from the open outer end 49 of the holder, with the keyway 71 sliding along the key bar 75. The mated key bar and keyway retain the housing 28 securely within the holder with the backing plate 50 closely adjacent the backing wall 42 of the holder.

As best seen in FIG. 2, the bladder 24 is an elongated flexible tube fabricated with a flattened shape and is matched to the housing channel 30 so that its back 76 abuts the front face 60 of the backing plate, its sides 78 extend substantially parallel to the facing inner walls 58 of the front pieces 52 and its front 38 faces the moving strip 10. An elongated protrusion 80 having a constricted neck 82 extends toward the strip 10 from the center of the front 38 of the bladder for engagement with a matching groove 86 having a constricted rear opening 88 formed in the rear portion 32 of the wiper blade 22. Due to the resiliencies of the bladder 24 and the wiper blade 32, the wiper blade may be snap-fitted onto the bladder protrusion 80.

The rear portion 32 of the blade 22 is substantially equal in width to the bladder 24 and the elongated channel 30 while the narrower front portion 34 extends centrally from the rear portion leaving a pair of shoulders 90 on either side. The front portion 34 is slightly tapered, narrowing toward its front or wiping surface 36 and fits closely between the flanges 62 which constrict the opening 53 of the channel 30. The close fit of the front portion 34 between the flanges helps to prevent the wiper blade 22 from being distorted by the strip 10 moving in a downstream direction and possibly being snapped out of engagement with the bladder protrusion 80. The shoulders 90 of the wiper blade 22 abut the bases of the flanges 62. While the shoulders 90 are generally parallel to the strip 10, the flanges taper toward the strip providing room for the center of the blade to be pushed outward of the channel 30 and move the wiping surface 36 of the blade 22 toward the strip 10 as the bladder 24 is inflated.

The bladder 24 and blade 22 may be conveniently cut from inflatable sealing stripping such as that commonly used to seal the doors of refrigerated railway cars. The bladder 24 is formed of polymeric material, such as rubber, reinforced with imbedded fibers 90 while the wiper blade 22 is formed of solid polymeric material, such as rubber. The corrugated front surface 36 of the stripping which forms multiple seals when used for sealing purposes, is found to have excellent wiping characteristics when used as a wiper blade 22.

The wiper blades 22, as best seen in FIGS. 1 and 4, are cut to extend just beyond either side of the strip 10 passing therealong while the bladders 24 are cut to extend well beyond the ends of the blade. At the inner end of the bladder 24 and beyond the end of the housing, the bladder is stretched over a ribbed plug 94 (FIG. 5) and secured thereto with an appropriate retaining ring fitting 96. At the outer side, the bladder 24 is stretched over a ribbed end 98 of a rigid connecting tube 100 and secured thereto by means of an appropriate retaining ring fitting 102. A flexible air line 104 from the pressure source 26 is screwed into a threaded outer end 105 of the connecting tube 100 for pressurizing the bladder 24.

As best seen in FIG. 5, the connection of the bladder to the ribbed end of the connecting tube 100 is outward of the outer end of the front housing pieces 52 and within a space 108 provided by a thinning of the housing backing plate 50 in this region. Outward of the outer end of the backing plate 50 is a block 110 having an aperture 112 in which the connecting tube 110 is retained, and the retaining block is attached to the backing plate by a joining plate 114 interconnecting their rear surfaces. The connecting tube 100 is positioned by the block 110 so that the bladder 24 extends from the ribbed end 98 at the level of the back of the channel 30, the connecting tube thereby helping to position the bladder 24 within the channel 30. An inner end 118 of the joining plate 114 abuts the outer end 120 of the backing wall 42 of the holder 18 when the wiping device 16 is inserted in the holder limiting the inward insertion of the device into the holder. A wire form handle 130 is attached to the outer end of the joining plate 114 to facilitate sliding the wiping device 16 into and from the holder 18.

The holders 18 are themselves situated within a larger support unit 132, only a portion of which is shown herein, the support unit typically standing on the floor of the plant that supports the strip processing line. Outward of the open ends 49 of the holders, the support unit 132 carries a pair of latches 134 (FIG. 4) which engage the handles 130 of the inserted wiping devices and prevent the wiping devices from sliding out of the holders 18 while the strip processing line is running. The latches 134 each have an inner arm 138 with a notched end 139 to catch the handle 130 of the inserted wiping device 16 and an outer arm 140 by which the latch 134 is disengaged. The latches 134 are journaled on shafts 142 carried by the support unit 132 for pivoting between an engagement or latching position, shown in solid in FIG. 4, and a release position, shown in ghost in FIG. 1. The weight of the outer arm 140 imbalances each latch 134 causing it to be naturally shifted by gravity to its engagement position unless the outer arm is lifted by the operator to disengage the handles 130 and allow the wiping devices 16 to be slid from the holders 18 for blade replacement or other maintenence.

Wiped treatment substances may exit the open outer ends 49 of the holders 18, and in FIG. 4 is illustrated an inclined trough 150 disposed below the holders at their open ends 49 to catch treatment substance and cause it to drain through a lower opening 152 which may be positioned above a gutter in the floor of the plant or appropriately connected to drainage tubing.

As illustrated diagrammatically in FIG. 4, the air lines 104 that connect the source 26 of pressurized air to the bladders have each a separate valve 160 and pressure gauge 162 whereby the pressure to each bladder 24 may be adjusted to determine the pressure of the wiping surface 36 against the surface 11 of the strip 10. Typically the bladder 24 is inflated to between about 3 and about 40 psi. Thus, wide flexibility is provided for adjusting the pressure of the wiper blades against the strip surfaces.

In order to wipe substances from strip 10 moving on a straight-line pathway, the wiping devices 16 are inserted fully into the holders 18 whereat notched ends 139 of the latches 134 engage the handles 130. The valves 160 from the pressure supply are opened to inflate the bladders to desired pressures to press the blades 22 firmly against the strip 10 to effect efficient wiping without causing unnecessary wear to the blades 22. As each blade 22 is gradually worn away by the friction of the moving strip 10, the pressure in the bladder 24 is increased slightly to insure good contact between the blade and the strip. Any sign of incomplete wiping indicates the need for increasing pressure within the bladders 24.

Eventually, each wiper blade 22 will need to be replaced, and when this occurs, the device 16 is removed from its holder 18 by first releasing the pressure from the bladder 24 to deflate the same so that the wiper blade does not bind against the surface 11 of the strip 10. The latch 134 is lifted up to release the handle 130 and the wiping device 16 is removed by pulling the device outward by its handle 130. After the device 16 has been removed, the blade 22 is slid out of the channel and off of the bladder 24, and a new wiper blade is fitted thereto. The device 16 is slid back into the holder, latched in place and reinflated. The process of wiper blade removal does not require stopping the strip processing line; however, it is preferred that at least two sets of wiper assemblies be provided along the strip pathway so that continuous wiping is assured during individual blade replacement.

The advantages of the invention may now be more fully appreciated. A relatively simple and inexpensive wiping assembly assures efficient wiping by the blades even as they wear down by providing means to incrementally and continuously adjust the pressure of the blades against the strip surface. When the wiper blades have been exhausted, they are simply and quickly replaced with no interruption of strip processing.

While the invention has been described in terms of a preferred embodiment, modifications obvious to one with ordinary skill in the art may be made without departing from the scope of the invention. For example, while the wiping assemblies have been shown and described perpendicular to the strip, the assemblies might be disposed at an angle other than perpendicular to the strip in order to channel the treatment substance to one side of the strip.

Various features of the invention are set forth in the following claims.

What is claimed is:

1. A device for wiping a surface of metal strip or the like moving in a continuous pathway comprising
   a housing having an elongated channel extending across the pathway of strip travel and opening toward the strip,
   an elongated blade member extending from said channel and having a wiping surface facing said strip for contact therewith and having a first interfitting means,
   an elongated inflatable member interposed in said channel behind said blade member having a second interfitting means which mates with said first interfitting means to removably attach said blade member to said inflatable member, and
   means for inflating said inflatable member to desired pressures in order to adjust the pressure of said wiping surface against the strip.

2. A device according to claim 1 wherein one of said interfitting means is an elongated recess and the other of said interfitting means is an elongated protrusion.

3. A wiping assembly for wiping a surface of metal strip or the like moving in a continuous pathway comprising
   an elongated holder extending across the pathway of strip travel and having an opening facing toward the strip and first attachment means,
   a housing having second attachment means for mating with said first attachment means when said housing member is slid into said holder across the pathway of strip travel and an elongated channel which faces the strip when said first and second attachment means are mated,
   an elongated blade member extending from said channel and having a wiping surface facing said strip for contact therewith,
   an elongated inflatable member interposed in said channel behind said wiping member, and
   means for inflating said inflatable member to desired pressures for adjusting the force of said wiping surface against the strip.

4. An assembly according to claim 3 wherein said blade member has first interfitting means and said inflatable member has a second interfitting means which mates with said first interfitting means to removably attach said wiping member to said inflatable member.

5. An assembly according to claim 4 wherein one of said interfitting means is an elongated recess and the other of said interfitting means is an elongated protrusion.

6. A pair of assemblies according to claim 3, one assembly disposed on each side of said strip to wipe opposite surfaces thereof.

7. An assembly according to claim 3, wherein one of said attachment means is an elongated keyway and the other of said attachment means is an elongated key bar.

8. An assembly according to claim 3 having means to latch said housing within said holder.

9. A device for wiping a surface of metal strip or the like moving in a continuous straight-line pathway comprising
   an elongated blade member formed of resiliently deformable material including a relatively wide rear portion and a relatively narrow front portion having a wiping surface for contacting said strip,
   a housing having an elongated channel extending across the pathway of strip travel, which channel includes a relatively wide rear portion substantially matched in width to the rear blade member portion for laterally positioning said blade member and elongated flange means defining an elongated constricted opening at the front of said channel substantially matched in width to said front blade member portion and through which said front portion extends into contact with said strip, said flange means serving to restrain said front blade member portion against lateral displacement even as said wiping surface presses against said strip with substantial force and serving to prevent dislocation of said blade member from said channel, an elongated inflatable member interposed in said channel behind said blade member, and means for inflating said inflatable member to desired pressures in order to adjust the pressure of said wiping surface against the strip.

10. A device according to claim 9 wherein said front portion of said blade member has tapered sides which diminish the width of said front portion in a direction toward said wiping surface, said tapered sides abutting said flange means with said inflatable member urging said front portion forward through said constricted opening.

11. A device according to claim 9 wherein said inflatable member is adapted for inflation to between about 3 and about 40 psi.

12. A device according to claim 9 wherein said flange means comprises a pair of elongated opposed flanges at the front of said channel.

* * * * *